Aug. 25, 1936.                J. J. GRADY                    2,052,288
                             AIRCRAFT SIGN
                          Filed Aug. 2, 1933              3 Sheets-Sheet 3
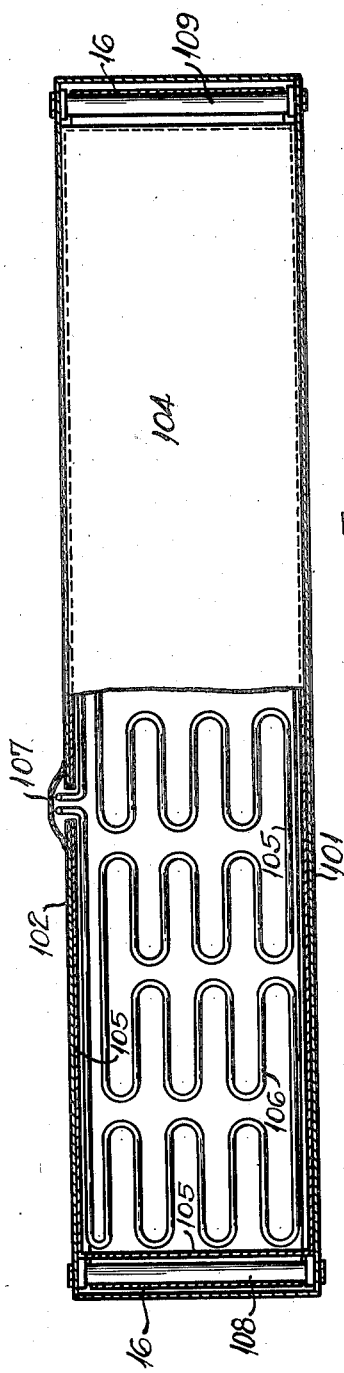
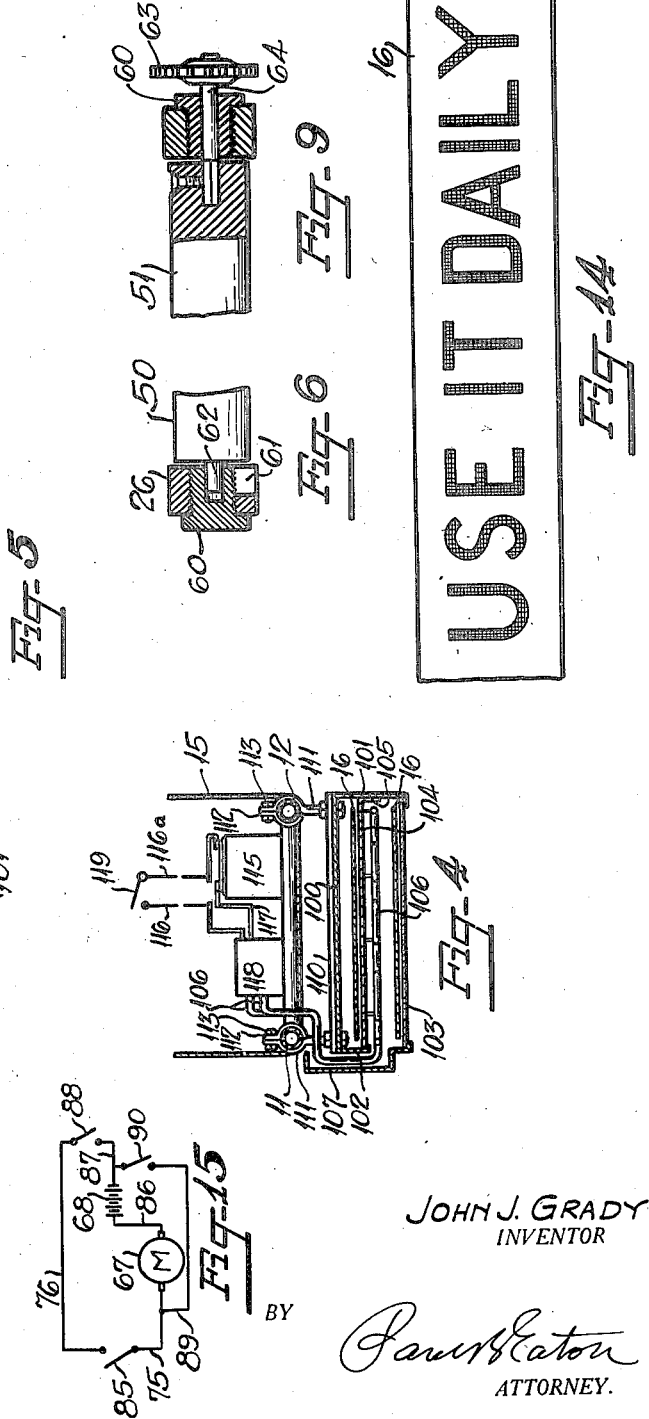
JOHN J. GRADY
INVENTOR
BY
ATTORNEY.

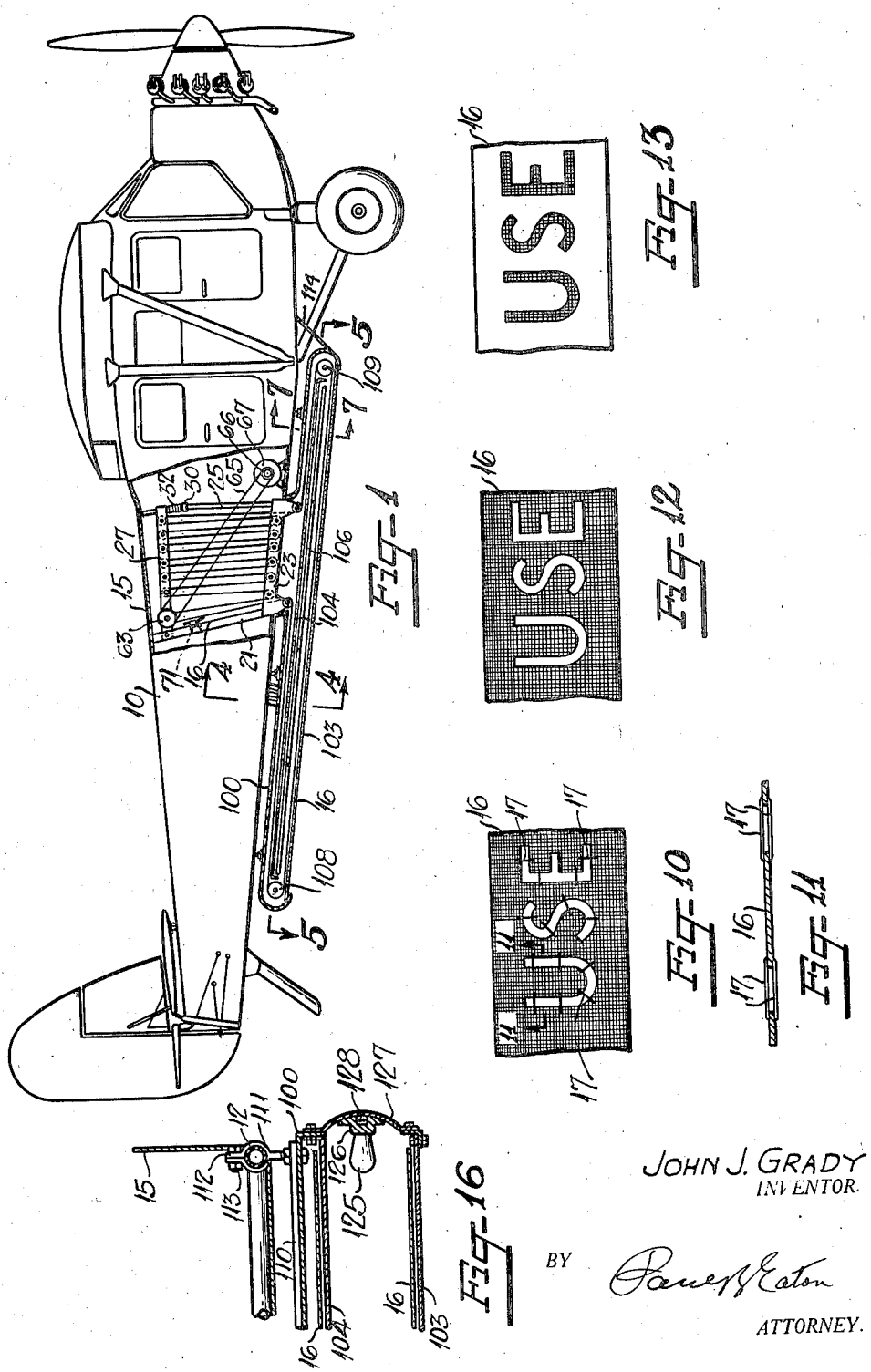

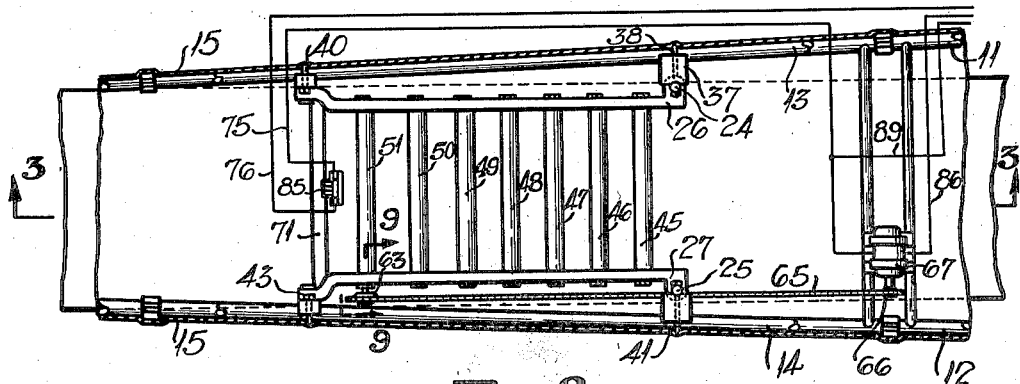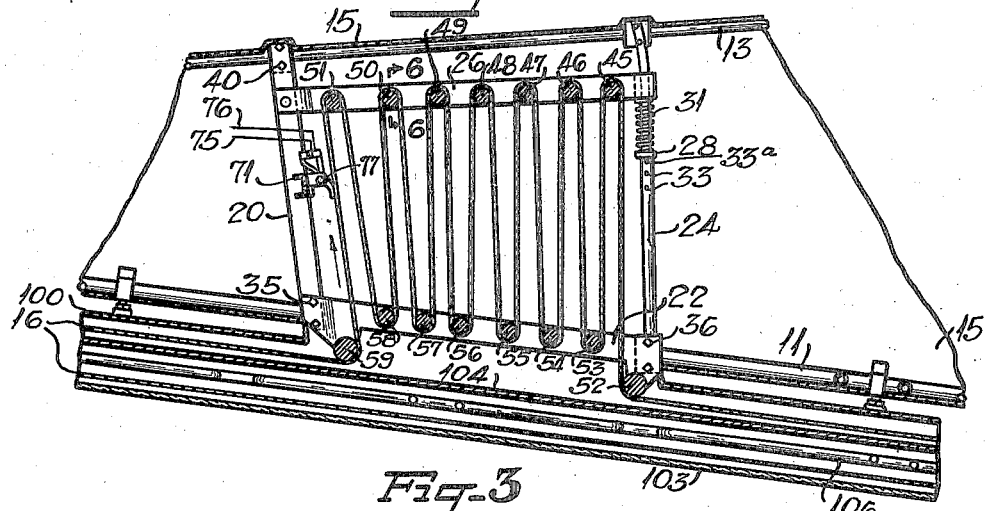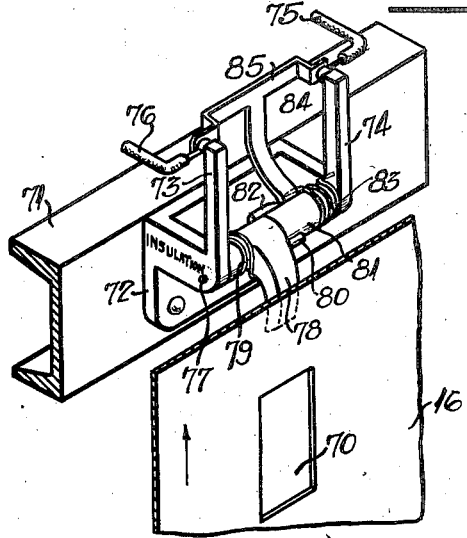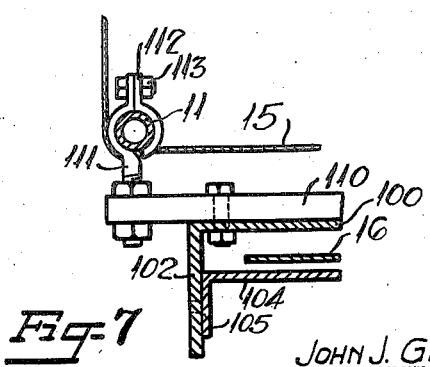

Patented Aug. 25, 1936

2,052,288

UNITED STATES PATENT OFFICE 2,052,288

AIRCRAFT SIGN

John J. Grady, Hammond, Ind., assignor of thirty percent to Paul B. Eaton and thirty percent to Paul E. Piersol Application August 2, 1933, Serial No. 683,355

6 Claims. (Cl. 40—29)

This invention relates to aerial advertising and more especially to an advertising device which can be secured to an aircraft without welding to, or penetration of the structural framework of the aircraft, and the securing of the sign to the aircraft without in any way interfering with the manoeuvreability thereof.

It is an object of the invention to provide a sign adapted to be carried by an aircraft and adapted to carry and display a fixed or movable sign at such a position on the aircraft as not to interfere with the identification markings thereon. It is a well known fact to all airmen that all airplanes must have identification markings displayed thereon, and the present ruling is to have these markings on the lower surface of the left wing and on the upper surface of the right wing, and it is thus seen that this materially shortens the space available for the affixing of a sign to the lower surface of a wing on an airplane for the reason that the identification markings cannot be obscured. It is therefore an object of this invention to provide a sign adapted to be secured to the lower surface of the fuselage of an airplane, though it is desired to be understood that the same can also be secured to the side of the fuselage as well as to the lower surface of the wing, should the regulations of the Department of Commerce, or other governing authorities permit such display.

It is a further object of this invention to provide an endless sign suitably housed and secured to the fuselage of an airplane and having a compartment disposed within the fuselage with a plurality of rollers therein over which the endless belt displaying the letters, pictures and other matter to be displayed, can be passed, thus enabling a much greater length in the endless belt, than would be possible otherwise.

It is a further object of this invention to provide a housing having means for supporting an endless belt carrying advertising matter thereon, with means on the housing whereby the housing can be secured to the longerons of the fuselage of the airplane by any suitable means, such as by clamping and the like, and by so doing, this will in no wise interfere with the craft being licensed by the Department of Commerce, as it is not welded to the craft, and the structure of the craft, other than the covering, is not pierced by the sign housing or the means for securing the same to the craft.

It is a further object of the invention to provide an apparatus adapted to be secured to and carried by an airplane while in flight, having an endless belt having matter thereon to be displayed to the public, the belt being suitably mounted in the apparatus and in the fuselage of the airplane and driven by suitable means such as an electric motor, with means for automatically stopping the travel of the endless belt at any desired point to display still matter if desired or to prevent repeating the display matter carried by the belt if such display matter is not desired to be repeated.

Some of the objects of the invention having been stated, the invention and other objects in part will appear in the detailed description hereinafter following, when taken in connection with the accompanying drawings, showing a preferred embodiment of the invention, in which—

Figure 1 is a side elevation of an airplane with parts thereof broken away, and showing the housing for the belt in section;

Figure 2 is a top plan view of the central portion of the fuselage, with the covering removed and the endless belt removed;

Figure 3 is an enlarged, longitudinal, sectional view of the fuselage and the casing for the display of the endless belt and taken along line 3—3 in Figure 2;

Figure 4 is a transverse, sectional view taken along the line 4—4 in Figure 1;

Figure 5 is a sectional view taken along line 5—5 in Figure 1 with a portion of the reflector being broken away to show the illuminating means;

Figure 6 is a sectional view taken along line 6—6 in Figure 3 showing a detail of the means for mounting the ends of the rollers in the fuselage;

Figure 7 is a transverse sectional view taken along the line 7—7 in Figure 1;

Figure 8 is an isometric detail of the means for stopping the endless sign when one complete revolution has been made, or a portion of a revolution, depending on the location of holes in the belt;

Figure 9 is a transverse sectional view taken along line 9—9 in Figure 2;

Figure 10 shows a portion of an opaque belt having the display cut therefrom;

Figure 11 is a sectional view taken along line 11—11 in Figure 10;

Figure 12 shows an opaque belt with transparent display;

Figure 13 shows a transparent belt with opaque display;

Figure 14 shows a greater length of a section of the belt than is shown in Figures 10, 12 and 13, to illustrate how several words are displayed at one time;

Figure 15 is a schematic wiring diagram of the means for moving and controlling the belt 16.

Figure 16 shows a modified form of the invention in which a plurality of electric light bulbs are used for illumination instead of a luminescent tube.

Referring more specifically to the drawings, the numeral 10 shows a conventional airplane, having conventional longerons 11, 12, 13, and 14 over which a conventional covering 15 is disposed, this usually being doped linen, though in some cases a metal covering is used for the fuselage and the wings, and the invention herein illustrated will operate equally well with either kind of covering, as it is not attached to the covering, but merely penetrates the same in a few places for securing the sign housing to the longerons of the fuselage.

Secured within the fuselage is a mechanism for carrying the endless belt 16 having display characters thereon. These can be arranged in any desired way or manner. In Figure 10 these are shown in the form of letters cut out of an opaque endless belt, and in such construction, lacings 17 may be used to hold the belt in flat position. Figure 12 shows an opaque belt with transparent letters thereon, while in Figure 13 a transparent belt having opaque characters thereon is shown, or for a non-illuminated sign a plain belt can be used with printed characters thereon.

The belt 16 can be of any suitable material and it is preferable to have a certain amount of elasticity therein, as by the incorporation therein of elastic fibres or strands to prevent its sagging.

The framework within the fuselage may extend throughout the entire length of the fuselage, should the belt be long enough to require a great number of rollers, but in the drawings, only one station is shown equipped with the framework having the rollers therein. This framework comprises vertically disposed members 20 and 21, which have secured to their lower ends the horizontally disposed members 22 and 23. Secured to the forward ends of the members 22 and 23 are the upstanding bars or rods 24 and 25, the upper ends of which slidably penetrate the forward ends of members 26 and 27, and the rear ends of said members 26 and 27 being pivotally mounted on the members 20 and 21. On each of the members 24 and 25 there is secured a washer, the one on 24 being designated by reference character 28, while the one on member 25 is designated by 30. These support the lower ends of compression springs 31 and 32, the upper ends of which support the forward ends of the members 26 and 27. The washers 28 and 30 are supported by any suitable means such as a cotter key 33a piercing holes 33 so that the upward force exerted by the springs can be regulated to preserve the tautness of the endless belt 16.

The member 22 is secured to longeron 11 by any suitable means such as U-bolts 35 and 36 being passed around the longeron and penetrating the member 22. The member 23 is likewise secured to longeron 12. The member 24 is secured to longeron 13 by any suitable means such as having a filler 37 disposed between the upper end thereof and the longeron and then passing a U-bolt 38 around the longeron and through the filler 37 and then through the upper end of member 24. Member 20 at its upper end is secured to the longeron 13 by a U-bolt 40 being passed around the longeron and through the upper end of member 20. The upper end of member 25 is secured in like manner as member 24, to longeron 14 by means of U-bolt 41 and the forward end of member 23 is secured in like manner as member 22. The rear end of member 23 is secured to the longeron in like manner as described for member 22. The upper end of 21 is secured to longeron 14 by means of U-bolt 43 passing around longeron 14. Although the means for clamping the framework to the interior of the fuselage is shown and described as U-bolts, it is evident that any suitable clamping means can be employed, as this method of fastening does not interfere with the structural features of the fuselage.

Members 26 and 27 have rotatably mounted therein a plurality of rollers designated by reference characters 45, 46, 47, 48, 49, 50 and 51, while the lower members 22 and 23 have rotatably mounted therein the rollers 52, 53, 54, 55, 56, 57, 58 and 59. The means for detachably mounting these rollers is best shown in Figure 6, where a bushing 60 is threadably secured in the members 22, 23, 26 and 27, and the upper portions of members 22 and 23, and the lower portions of members 26 and 27 have slots 61 therein through which the bearing portions 62 of the rollers can be inserted and removed.

The springs 31 and 32 press the members 26 and 27 upwardly at all times and keep the belt 16 taut.

The belt 16 is driven by any suitable means such as by placing a sprocket 63 on the end of roller 51, this roller being mounted on shaft 64, which fits into a squared hole in roller 51, so that when the other end of roller 51 is released by unscrewing its bushing, the roller 51 can be pulled off the shaft 64 after its other end has been lowered. The sprocket 63 is driven by any suitable means such as a sprocket chain or link belt 65 which is also mounted on sprocket 66 on motor 67, which motor 67 is driven by any suitable source of energy such as electrical energy 68, though it is desired to be understood that the mechanism can be driven by any suitable source of energy, such as a spring, propeller and the like.

In order to stop the belt 16, carrying the display, when it has made a complete revolution and thus to prevent repeating the sign, or in case it is desired to stop the belt at any point to display "still" matter, the belt can be provided with one or more perforations 70, which cooperate with the mechanism shown in Figure 8. A transverse support 71 is provided having a bracket 72, of insulating material, having upstanding portions 73 and 74 provided with contacts on the upper ends thereof. To these contacts are secured the wires 75 and 76. A shaft 77 is disposed in bracket 72 and has rotatably mounted thereon a dog 78 having its free end normally pressed upward by a torsion spring 79. The dog 78 has a laterally projecting pin 80. Also mounted on shaft 77 is a switch hub 81 having a projection 82 thereon. A torsion spring 83 surrounds this hub 81 and tends to move switch arm 84 towards the observer in Figure 8. This arm 84 has mounted on the upper end thereof a conductive bar 85 which has contacts thereon adapted to engage the contacts on the upper ends of the members 73 and 74. While dog 78 is not engaged in a perforation 70 the parts remain in the position in Figure 8, but when dog 78, engages a perforation 70 in belt 16, the pin 80 strikes lug 82 and opens the circuit normally passing through bar 85 and stops movement of the belt 16. Wire 75 leads to one side of the motor 67 and a wire 86 leads from the other side of the motor to the source of energy 68 and a wire 87 leads from the other side of the source of energy to switch 88 which is usually mounted on the instrument board of the aircraft.

Switch 88 is closed while the belt 16 is in motion. It is seen that when a perforation in belt 16 opens switch 85 that the motor is stopped. Should the pilot desire to continue to operate the belt 16, means are provided whereby the belt 16 can again be started in motion while the craft is in flight. This means includes a wire 89 connected to a wire 75 and led to a switch 90 of the push button type, the other side of which is connected to wire 87, so that the pilot or operator of the sign may press switch 90 to cause the motor to advance belt 16 to cause dog 78 to ride out of the perforation 70 and the strength of spring 83 being stronger than spring 79 will force the dog downwardly past dead center and then it will fall away from the belt and the parts will assume the position shown in Figure 8. If uninterrupted movement of the belt is desired, then spring 79 can be released to render it inoperative.

In order to provide a display surface for exhibiting portions of the belt 16 and the display matter thereon, there is provided a casing having top 100, sidewalls 101 and 102, a transparent bottom 103 extending along the entire length of the casing. A reflector 104 is secured in the casing in any suitable manner by having flanges 105 thereon which are secured to the sidewalls. Suitable means for illumination are provided which are shown in the form of a luminescent tube 106 secured below the reflector. This tube is led into the casing in any suitable manner as by having a flared portion 107 through which the tube enters the casing and after a series of bends is returned from the casing and into the fuselage through the same point. Suitable rollers 108 and 109 are mounted near the ends of the casing for rotation and for supporting the endless belt 16.

The casing is secured to the fuselage in any suitable manner, such as by having a plurality if straps 110 which are penetrated by a plurality of clamp members 111 which also penetrate the casing if desired. These clamps 111 pentrate the covering 15 and have an auxiliary clamp 112 penetrated by bolt 113, which also penetrates clamp 111 and thus clamps the casing to the lower longerons of the craft and thus in no way interferes with the structural requirements of the aircraft. The top 100 has an opening therein immediately below the compartment in the fuselage having the roller therein to facilitate the entry of the belt into the apparatus.

Although the top and bottom are shown integral with the sides of the casing, it is evident that these may be detachable with relation to each other in case access should be desired to the interior of the casing, though, such access will not be necessary for the placing of a new belt 16 therein to display new matter, as the belt in the apparatus can be separated and the new belt connected to one end of the old belt and by advancing the old belt, the new belt can be installed in the apparatus and after being installed, its ends can be secured together and the apparatus is ready for displaying the new advertising matter.

In order to reduce air resistance, a faring 114 is secured to the fuselage and shields the front end of the casing.

In Figure 4 is shown the means for illuminating the tube 106. This is shown in the form of a battery 115, connected by wires 116 and 117 to a suitable apparatus 118 for illuminating the tube 106. The apparatus 118 is conventional and need not be described. Wire 116 is led preferably to the instrument board of the plane and from there is led through a switch 119 and through wire 116a, battery 115, wire 117 and back to apparatus 118, so the illumination can be controlled from the instrument board of the craft.

Throughout the drawings, except in Figure 16, the means for illuminating the sign is shown as being neon tubes. It is evident that any desired means may be employed, which will be more satisfactory than neon tubes. In Figure 16, there is shown, what is really a preferred embodiment of the invention in which the sidewalls of the casing are formed into reflecting members 127, along the interior reflecting surface of which are mounted a plurality of sockets 126 for receiving the electric bulbs 125. Wires 128 are connected to these sockets for illuminating the bulbs. It is seen that the bulbs not only throw light directly onto the tape 16, but also indirectly by striking the reflector 104 and then onto the tape; also some of the light first strikes the reflector 127 to be projected onto the tape or onto the reflector 104. Figure 16 shows a cross-sectional portion of one side of the sign, but it is evident that the other side of the sign is similar to form a symmetrical casing.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Exhibition means adapted to be secured to the fuselage of an airplane and carried thereby while the airplane is in flight, comprising a casing having a roller at each end thereof, means for detachably securing said casing to the fuselage of the airplane, a plurality of rollers mounted within the fuselage, an endless belt supported by the rollers in the casing and by the rollers in the fuselage, and means for imparting rotation to at least one of said rollers for imparting motion to said endless belt, display matter disposed on said belt, said casing having a transparent portion through which the said belt is visible from a point removed from the airplane.

2. In a changeable exhibitor for the fuselage of an airplane, a casing disposed in spaced relation to the fuselage of the airplane and extending longitudinally thereof, the bottom of the casing being transparent, an endless belt being disposed within the casing, display matter on the belt, a roller in each end of the casing for supporting said belt, illuminating means disposed between the two portions of the belt when separated by said rollers, means for securing said casing to the fuselage of the airplane, means for imparting movement to said belt to exhibit display matter through said transparent bottom, and means for automatically arresting movement of the belt when it has been moved a predetermined amount.

3. In a changeable exhibitor adapted to be secured to the fuselage of an airplane, a casing disposed longitudinally of the fuselage and on the exterior thereof, means for securing the casing to the fuselage structure, the bottom of the casing being transparent, a roller mounted in each end of the casing, an endless belt mounted on said rollers, a reflector mounted in the same plane as the rollers and being disposed therebetween, illuminating means disposed immediately below the reflector, display matter disposed on said belt, means for imparting movement to said belt to successively exhibit the display matter thereon through said transparent bottom, means for automatically arresting the movement of the belt at a predetermined point, and means for moving the belt past the means for automatically arresting the same.

4. In a sign for airplanes, a casing disposed longitudinally of the fuselage of the airplane, said casing having a transparent bottom therein, an endless belt mounted in the casing and having display matter thereon visible through said transparent bottom, the upper portion of the casing having an opening through which the belt is adapted to be led into the fuselage, a plurality of rollers being mounted in the fuselage of the airplane on which the belt is adapted to be mounted, means for imparting rotary motion to at least one of said rollers to impart movement to said belt.

5. In a sign for airplanes, a casing disposed longitudinally of the fuselage of the airplane, said casing having a transparent bottom therein, an endless belt mounted in the casing and having display matter thereon visible through said transparent bottom, the upper portion of the casing having an opening through which the belt is adapted to be led into the fuselage, a plurality of rollers mounted in the fuselage of the airplane on which the belt is adapted to be mounted, means for imparting rotary motion to at least one of said rollers to impart motion to said belt and means for illuminating the display matter carried by said belt while it is passing through said casing.

6. Exhibition apparatus for an airplane, said airplane having a fuselage, a casing disposed beneath the fuselage and detachably secured thereto, said casing having a transparent bottom, an endless belt mounted within the casing and having display matter thereon visible through said bottom, the upper side of the casing having an opening therein through which the belt is led into the fuselage, a plurality of upper rollers and a plurality of lower rollers disposed within the fuselage and over which the belt is adapted to be placed to support the belt for movement, and means for imparting movement to said belt to cause it to travel past said bottom to exhibit the display matter thereon.

JOHN J. GRADY.